United States Patent [19]

Peekema et al.

[11] Patent Number: 4,598,303

[45] Date of Patent: Jul. 1, 1986

[54] METHOD AND APPARATUS FOR OPERATING AN INK JET HEAD OF AN INK JET PRINTER

[75] Inventors: Thomas E. Peekema, Beaverton; James O. Beehler, Canby, both of Oreg.

[73] Assignee: Tektronix, Inc., Beaverton, Oreg.

[21] Appl. No.: 675,687

[22] Filed: Nov. 28, 1984

[51] Int. Cl.[4] .......... G01D 15/18

[52] U.S. Cl. .......... 346/140 R; 346/1.1

[58] Field of Search .......... 346/140 PD, 1.1

[56] References Cited

U.S. PATENT DOCUMENTS

| | | | |
|---|---|---|---|
| 4,106,032 | 8/1978 | Miura et al. | 346/140 PD |
| 4,223,324 | 9/1980 | Yamamori et al. | 346/140 PD |
| 4,358,781 | 11/1982 | Yamamori et al. | 346/140 PD |
| 4,417,259 | 11/1983 | Maeda | 346/140 PD |
| 4,458,255 | 7/1984 | Giles | 346/140 PD |

*Primary Examiner*—George H. Miller, Jr.
*Attorney, Agent, or Firm*—David P. Petersen; Francis I. Gray; John D. Winkelman

[57] ABSTRACT

A method and apparatus is disclosed for operating an ink jet print head 14 of the type having an air chamber 64 to which a stream of air is delivered and an ink chamber 32. A valve 48 interrupts the flow of air to the air chamber 64 from time to time, such as after each copy of a print is printed by the print head. This reduces the air pressure within the air chamber 64 and permits ink from ink chamber 32 to enter the air chamber 64 and replenish ink within the air chamber. The ink pressure is increased while the air pressure is reduced. This reduces the time required to replenish the ink. With the ink in the air chamber maintained at a consistent quantity and shape, the convergence of ink drops on printing medium is enhanced.

19 Claims, 4 Drawing Figures

METHOD AND APPARATUS FOR OPERATING AN INK JET HEAD OF AN INK JET PRINTER

TECHNICAL FIELD

This invention relates to ink jet printers, and in particular to a method and apparatus for operating an ink jet head of such a printer so as to increase the convergence of such drops on printing medium.

BACKGROUND OF THE INVENTION

Ink jet printers having one or more ink jet heads for projecting drops of ink onto paper or other printing medium to generate graphic images and text have become increasingly popular. To form color images, ink jet printers with multiple ink jet printing heads are used, with each head being supplied with ink of a different color. These colored inks are then applied, either alone or in combination, to the printing medium to make a finished color print. Typically, all of the colors needed to make the print are produced from combinations of cyan, magenta, and yellow ink. In addition, black ink may be utilized for printing textual material or for producing true four-color prints.

In a common arrangement, the print medium is attached to a rotating drum, with the ink jet heads being mounted on a traveling carriage that traverses the drum axially. As the heads scan paths over the medium, ink drops are projected from a minute orifice in each head to the medium so as to form an image on the medium. A suitable control system synchronizes the generation of ink drops with the rotating drum.

To produce images of certain colors, more than one color of ink is combined on the medium. That is, ink drops of a first color are applied to the medium and then overlaid by ink drops of a second color to produce the desired color of the image. If the drops do not converge on the same position on the medium, that is, if the drops of the two colors do not overlie one another, then the color of the image is distorted. Furthermore, it is also important that drops of substantially uniform size and shape be generated by the ink jet heads. To the extent that the drops are non-uniform, the image is distorted.

In one basic type of ink jet printing system, ink drops are produced on demand. An exemplary drop-on demand printer is illustrated in U.S. Pat. No. 4,106,032 of Miura et al. In the Miura printer, ink is delivered to an ink chamber in the ink jet head. Whenever a drop of ink is needed, an electric pulse is applied to a piezoelectric crystal, causing the crystal to constrict. As a result, because the crystal is in intimate mechanical contact with ink in the ink chamber, a pressure wave is transmitted through the ink chamber. This causes the formation of an ink drop at an internal drop-forming orifice outlet of the ink chamber. The ink drop passes from the drop forming orifice and through an air chamber toward a main external orifice of the ink jet head. This latter orifice leads to the printing medium. Air under pressure is delivered to the air chamber and entrains the drop of ink in a generally concentric air stream as the ink drop travels through the air chamber. This air stream increases the speed of the drops toward, and the accuracy of applying the drops to, the print medium.

Following the printing of a copy, in certain known ink jet printers, the ink jet heads are typically returned to a rest position against a mechanical cap until the next copy is printed. Also, when the power to such an ink jet printer is turned off, the air stream stops and these devices commonly flood the air chamber with ink from the ink chamber. Upon restarting the printer, the air stream is reestablished. It heretofore has been assumed that the reestablished air stream in the air chamber would blow all of the ink in the previously flooded air chamber outwardly from the main external orifice and into the cap.

These known devices suffer from a number of drawbacks. In particular, it is difficult to converge ink drops on particular positions of the print medium. Furthermore, it has been observed that the drop ejection angle shifts as these ink jet printers operate. The ink drop ejection angle is the angle between the line of travel of drops leaving the main external orifice of the ink jet print head and a line projecting from the main external orifice in a direction normal to the surface of the ink jet print head. This shifting further disturbs the convergence of the ink drops on the print medium. Moreover, with such devices, problems have been encountered in maintaining the uniformity of ink drop size and shape.

Therefore, a need exists for an improved method and apparatus for operating an ink jet head of an ink jet printer which is directed towards overcoming these and other disadvantages of prior art devices.

SUMMARY OF THE INVENTION

Following the flooding of the air chamber, the restarting of the ink jet printer, and reestablishment of the air stream through the air chamber, not all of the ink is immediately removed from the air chamber. Instead, a small quantity of ink remains. In accordance with the present invention, it has been discovered that the quantity, shape and position of this remaining ink affects the ejection angle at which drops are ejected from the ink jet print head. Also, the quantity and shape of this remaining ink affects the size and shape of the ejected ink drops. Furthermore, as an ink jet head operates, the remaining ink is reduced in quantity and the shape of the remaining ink in the air chamber changes. This is believed to be primarily due to evaporation of ink from the air chamber and into the air stream passing through the air chamber. These changes in the remaining ink cause the drop ejection angle to shift during operation of the ink jet printer. As a result, the pattern of drops flowing from the ink jet print head is disturbed and the ink drops shift out of convergence on the print medium. Furthermore, changes in this remaining ink also alter the size and the shape of ink drops leaving the ink jet print head.

Therefore, a major cause of disturbances in the convergence of ink drops from the ink jet print heads, and also one source of non-uniformity in size and shape of ink drops generated by the ink jet head, has been discovered. Furthermore, in accordance with the present invention, these problems are minimized by maintaining the remaining ink at a relatively constant quantity, shape, and position within the air chamber during the operation of the ink jet print head of the ink jet printer. This is accomplished by introducing ink into the air chamber of the ink jet head from time to time so as to maintain a consistent ink geometry therein.

In accordance with a more specific aspect of the present invention, the flow of air into the air chamber is interrupted from time to time to allow ink from the ink chamber to enter the air chamber and replenish the remaining ink therein.

As a further aspect of the present invention, ink is introduced into the air chamber to replenish the ink remaining in the air chamber at times between the printing of copies by the ink jet printer.

In accordance with still another specific aspect of the present invention, upon return of the ink jet heads to their rest capped position following the printing of a copy, air flow to the air chamber is interrupted for a period of time which enables ink from the ink chambers of each head to flow into the respective air chambers of the heads. Thereafter, upon reestablishing air flow in the heads, excess ink is blown from the air chamber and into the cap. Following the removal of this excess ink, the ink remaining in the air chamber is of a similar quantity, shape and in a similar position as the ink remaining after other such ink replenishment cycles. Furthermore, the remaining ink is of a similar size, shape, and position as the ink remaining when the ink jet printer is restarted after power to the printer has been shut off. Because the size, shape, and position of the ink remaining in the air chamber is consistently maintained, a more consistent drop size, shape, and drop ejection angle results.

As still another aspect of the present invention, as air flow through the air chamber is interrupted, air pressure in the air chamber drops. Simultaneously, ink pressure within the ink chamber is increased. This enhances the flow of ink from the ink chamber and into the air chamber of the ink jet head.

Therefore, it is one object of the present invention to provide an improved ink jet printer, and in particular an improved apparatus and method of operating ink jet heads of such a printer so as to enhance the control of the placement of ink drops on printing medium.

It is still another object of the invention to provide such a method and apparatus which improves the consistency of the angle at which ink drops are ejected from the ink jet print heads, thereby enhancing the convergence of the ink drops on the printing medium.

It is a further object of the present invention to provide such a method and apparatus which increases the uniformity in size and shape of ink drops generated by the ink jet heads.

It is another object of the present invention to provide such a method and apparatus which is easily included in new ink jet printers and which is also easily incorporated into existing ink jet printers.

These and other objects, features, and advantages of the present invention will become apparent with reference to the following detailed description and drawings.

DETAILED DESCRIPTION OF A PREFERRED EMBODIMENT

Figure 1:
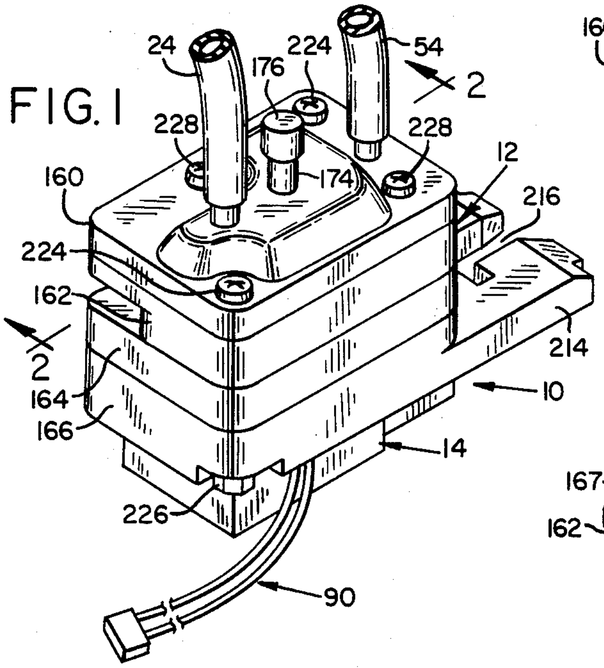
FIG. 1 is an isometric view of an ink drop generating module which includes an ink jet print head operated in accordance with the present invention.
Figure 2:
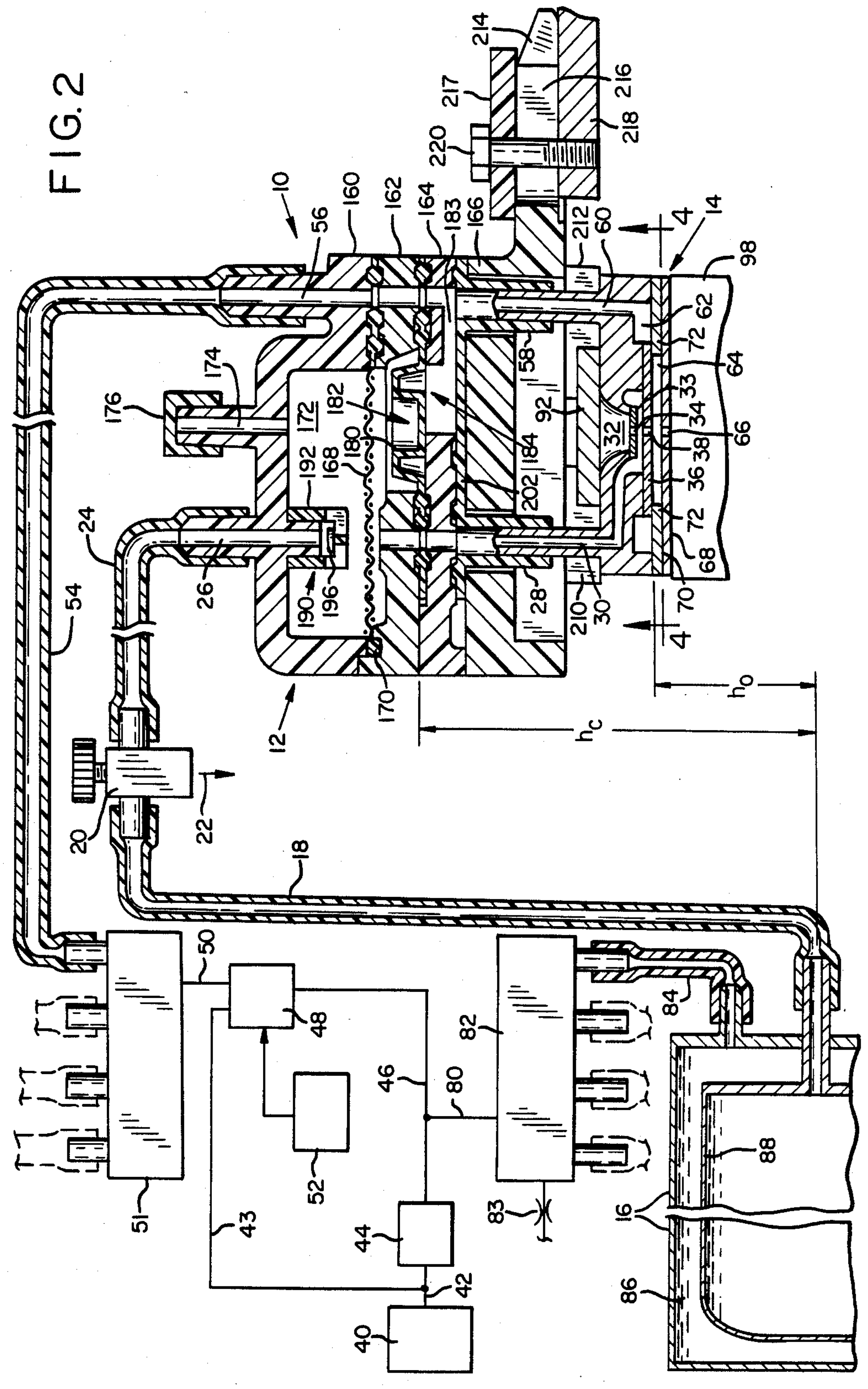
FIG. 2 is a cross sectional view of the module of FIG. 1, taken along lines 2—2 thereof, together with additional elements of an ink jet printer in accordance with the present invention.

With reference to FIGS. 1 and 2, an ink drop generating module 10 is shown for applying ink to paper or other printing medium. Module 10 is a compact unit having a body 12 which contains an optional ink pressure transient suppression system explained below, and an ink jet printing head 14 mounted to the body. Ink is supplied by an ink cartridge 16 and flows through a conduit 18, a three-way valve 20 having an air bleed position for bleeding air from the line at 22, and through a conduit 24 to an ink flow passageway 26 of the body. The ink flow passageway 26 passes through the interior of the body 12 to an ink outlet 28. From outlet 28, the ink enters an ink passageway 30 of the ink jet print head 14. The ink passageway 30 delivers ink to an ink chamber 32. The ink chamber is closed by a cover 33. Ink enters the ink chamber through an orifice 34 in cover 33, the orifice 34 communicating between the ink passageway 30 and the ink chamber 32. Spaced from the cover 33, and positioned within the ink jet print head 14 to close one side of the ink passageway 30, is a plate 36. This plate has an ink drop forming orifice 38. As explained below, ink drops are generated at orifice 38 and are directed outwardly therefrom.

In the illustrated embodiment, ink jet print head 14 is of the air assisted drop-on-demand type, such as is disclosed in U.S. Pat. No. 4,106,032 of Miura et al. During normal operation of this particular ink jet print head, a source of pressurized air is required and is generated by an air pump 40. Air from pump 40 is delivered through an air line 42, an air pressure regulator 44, an air line 46, and through a normally open path of a solenoid actuated valve 48 to an air line 50 and thence to an air manifold 51. In addition, for purposes explained below, a conduit 43 is provided from valve 48 to the conduit 42. Valve 48 closes conduit 43 at times when line 46 is coupled through the valve to line 50.

A valve controller 52 is provided which, during the normal operation of the device, energizes the solenoid of the valve 48 to shift the valve to a position in which the conduit 46 communicates through the valve to the conduit 50. When in this condition, the pressurized air passes along a line 54 from the manifold 51 to an air passageway 56 within the body 12. The manifold 51 includes additional outlets leading to other, similar modules 10. In body 12, air passes along the passageway 56 and through an air outlet 58 to an air passageway 60 in the ink jet print head 14. Air from passageway 60 enters an annular air channel 62 which is in communication with an air chamber 64. The pressurized air entering the chamber 64 forms a generally concentric air stream which accelerates ink droplets from the ink drop forming orifice 38 outwardly through a main external orifice 66 in an ink jet head closing plate 68. The plate 68 is spaced from the plate 36 to form the air chamber 64 therebetween.

Figure 4:
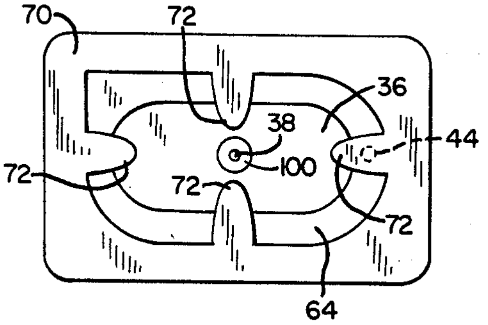
FIG. 4 is a bottom sectional view of an ink jet print head taken along lines 4—4 of FIG. 2.

An annular spacer 70, best shown in FIGS. 2 and 4, is provided for maintaining the separation between the plates 36 and 68. Fingers 72 of the spacer 70 project from the perimeter of the spacer, across the channel 62, and have portions which are sandwiched between the plates 36 and 68. These latter portions reinforce the plate 68 and maintain the spacing between the plates 36 and 68. At the same time, air flow is permitted between the channel 62 and air chamber 64.

Referring to FIG. 2, pressurized air from line 46 is also directed, during normal operation of the apparatus, through a conduit 80, a manifold 82, a conduit 84, and to an interior cavity 86 of the ink cartridge. This air pressure forces ink from a flexible collapsible ink-containing bag 88 of the cartridge outwardly through the conduit 18 and to the module 10. Manifold 82 includes additional outlets leading to other, similar ink cartridges. Also, the manifold 82 includes an orifice 83 for bleeding off excess air from the manifold to limit the pressure therein.

The ink jet head 14 is scanned over the printing medium in a conventional manner. Whenever printing is desired, an electric pulse is applied via leads 90 (FIG. 1) to a piezoelectric crystal 92 (FIG. 2) in the ink jet head. When pulsed, the crystal produces a pressure wave which forces ink from the chamber 32 toward the internal ink forming orifice 38 of the head. As an ink droplet forms and is urged outwardly from this internal orifice, the air stream from the air chamber 64 accelerates the speed of the ink droplet outwardly through the main orifice 68 and toward the printing medium.

When ink jet printers are not being utilized to make copies, the carriage supporting the ink jet heads 14 is typically moved to a rest position. When in this position, the heads abut and are capped by cap 98, indicated schematically in FIG. 2. This cap traps any ink that may leak from the orifice 66 when the ink jet head is not being used to make copies. Also, at certain times, the power to the ink jet printer is typically turned off, for example during transport of the printer or during periods of non-use. At such times, the air chamber 64 is typically flooded with ink to minimize the possibility of an air bubble forming at the internal drop forming orifice 38. Such a bubble could clog the ink jet head 14 and prevent it from operating.

When power is restored to the ink jet printer, air flows through the chamber 64 and blows out some of the ink from the chamber through the main external opening 66 and into the cap. However, a wet region or pool of ink 100 (FIG. 4) surrounding orifice 38 remains in the air chamber. Consistently, for a given ink jet print head, the geometry of the ink remaining following the blowing out of a flooded head will be the same as the geometry following other blowing out cycles. This remaining ink affects the angle at which droplets of ink are ejected from the orifice 66 toward the printing medium. In the absence of the present invention, the ink remaining in air chamber 64 changes significantly in quantity, shape and position as the ink jet head is operated. As previously mentioned, such changes cause the drop ejection angle to shift during operation of the ink jet printer. In addition, the size and shape of the ink drops leaving the ink jet print head are also affected by changes in the quantity and shape of the remaining ink.

In accordance with the present invention, ink is introduced into the air chamber 64 from time to time to replenish the ink therein so as to maintain this remaining ink at a consistent size and shape. This in turn improves the constancy of the angle at which drops are ejected from the ink jet printer. Also, this improves the uniformity of the size and shape of such ink droplets. As a result, greater control of the location at which ink droplets are applied to printing medium is provided.

This replenishment of the ink in the air chamber 64 is accomplished by reducing the air pressure within the air chamber 64 relative to the ink pressure in the ink chamber 32 and ink passage 30. When the air pressure is reduced, ink flows into the air chamber 64 and replenishes the ink therein. This restores the ink in the air chamber to the same geometry as is the case following the blowing out of a flooded ink jet print head. As a result, the consistency of the drop ejection angle and of the ink droplet size and shape is improved.

With reference to FIG. 2, as previously mentioned, during normal operation of the ink jet printer, pressurized air 46 is fed through the valve 48 to the conduit 50. From conduit 50, the pressurized air flows through the manifold 51, the conduit 54, passageways 56 and 60, the air channel 62, and to the air chamber 64. To replenish the ink in air chamber 64, the valve controller 52, which may comprise a computer actuated relay controlled electric switch, is operated to direct electric current to a solenoid of the valve 48. This shifts the valve to a position which couples the conduits 46 and 43 together and also blocks the flow of air to conduit 50. This blocks the flow of air into the air chamber 64 and causes a drop in the air pressure in the air chamber. When the air pressure drops, ink from the ink passageway 30 and chamber 32 flows into the air chamber 64 and replenishes the ink therein. After enough time has elapsed to allow the replenishment of the ink in the air chambers of all of the ink jet heads of the printer, the valve 48 is then switched to its normal operating position, which recouples the conduits 46 and 50 together. Air then again flows through the air chamber 64. Any excess ink in the air chamber is blown from the air chamber 64 through the main orifice 66, thereby returning the ink remaining in the air chamber to a consistent quantity and shape following each such replenishment.

In the illustrated embodiment, this interruption of the air flow takes place at times when the ink jet head supporting carriage has returned to its rest position with the ink jet head 14 abutting the cap 98. Therefore, any excess ink exiting from the air chamber is collected by the cap and is not spilled. Inasmuch as the carriage returns to this rest position typically between the printing of copies, the ink replenishment cycle is repeated at such times. Limit switches, or other conventional sensors, may be utilized to detect and generate a control signal upon the return of the carriage to the rest position. In response to such control signal, the switch 52 is operated to control valve 48 as previously explained and to allow ink to enter the air chambers of the ink jet heads. After a predetermined time interval, such as established by a timer, the switch 52 is operated to cause the valve 48 to return to its normal position and air flow to the air chambers is reestablished. The length of the time period required to accomplish this replenishment of the ink may be empirically determined for a particular ink jet head printer. However, replenishment time periods on the order of 0.7 seconds are exemplary. With shorter time periods, all of the ink pools of the various ink jet print heads may not be replenished to their original condition, and less satisfactory results are obtained. If longer time periods are employed, more ink than necessary is blown out to the cap 98 when the air flow is again restored to the air chamber.

As previously mentioned, when the ink is to be replenished, the valve 48 is shifted to a position which connects conduit 46 to the conduit 43. This permits the flow of unregulated air from the pump 40 through conduits 42, 43, the valve 48, conduit 46, through manifold 82, conduit 84, and to the interior 86 of the cartridge 16. This maintains the ink pressure within the ink cartridge and also within the ink passageway 30 and ink chamber 32. If this ink pressure were allowed to drop, upon reestablishment of the air flow in air chamber 64, the pressure in the air chamber, relative to the pressure in the ink chamber under normal operating conditions, could rise. Moreover, this rise in air pressure relative to ink pressure in the head 14 could cause an air bubble to form at the internal orifice 38 and clog the head. By maintaining air pressure to the ink cartridge 16 at times when the air flow is interrupted to the air chamber 64, this risk is minimized. Furthermore, because unregulated air reaches the interior 86 of the cartridge 16 under these conditions, not only is ink pressure in passageway 30 and chamber 32 maintained, it tends to increase. Thus, the ink pressure within the ink jet head 14 increases while the air pressure in chamber 64 is decreasing. This increases the rate of ink flow into the air chamber when the air flow is interrupted. Therefore, the amount of time required to replenish the ink is decreased.

It should be noted that the volume of the air chamber 64 is small, for example approximately 0.003 milliliters. Furthermore, cartridges typically contain on the order of 200 milliliters of ink when full. Therefore, only an extremely small fraction of the ink from a cartridge is required to replenish the ink pool.

That is, less than one sixty-thousandth of a cartridge is required. Consequently, although satisfactory performance results with less frequent ink pool replenishment, ink pools may be replenished between the making of each print, without significantly affecting the life of an ink cartridge.

The ink jet print heads 14 of ink jet printers are subject to clogging by any particulate material in ink supplied to the head. Such clogging also results from air bubbles entrained within and carried by the ink delivered to the head.

Also, in an air assisted ink jet print head, the differential in pressure between the pressure of ink in ink passageway 30 and ink chamber 32 and the pressure of the air in air passageway 60 is important. Furthermore, the optimum differential for a particular head is usually specified by the manufacturer of the head. As a convenient and known way of initially establishing this differential, the head is elevated a distance $h_o$, relative to the elevation of the ink cartridge.

Pressure fluctuations occur in the ink supply passageways during normal operation of an ink jet printer. These pressure differentials result from, for example, bumping the printer during use. Whenever the pressure in the ink passageway 30 drops relative to the pressure in air chamber 64, there is a risk that air will be ingested into the ink drop forming orifice 38. When this happens, the head clogs and ceases to print.

To minimize these problems, an optional transient pressure suppressing system is included within the body 12 for suppressing and attenuating high and low frequency pressure transients in the ink supply line to module 10. This minimizes pressure drops within the ink supply line and the resultant risk of ingestion of print head clogging bubbles into orifice 38. Furthermore, there is provided within the body 12 a mechanism for trapping air bubbles and contaminants carried in the stream of ink reaching the head.

Figure 3:
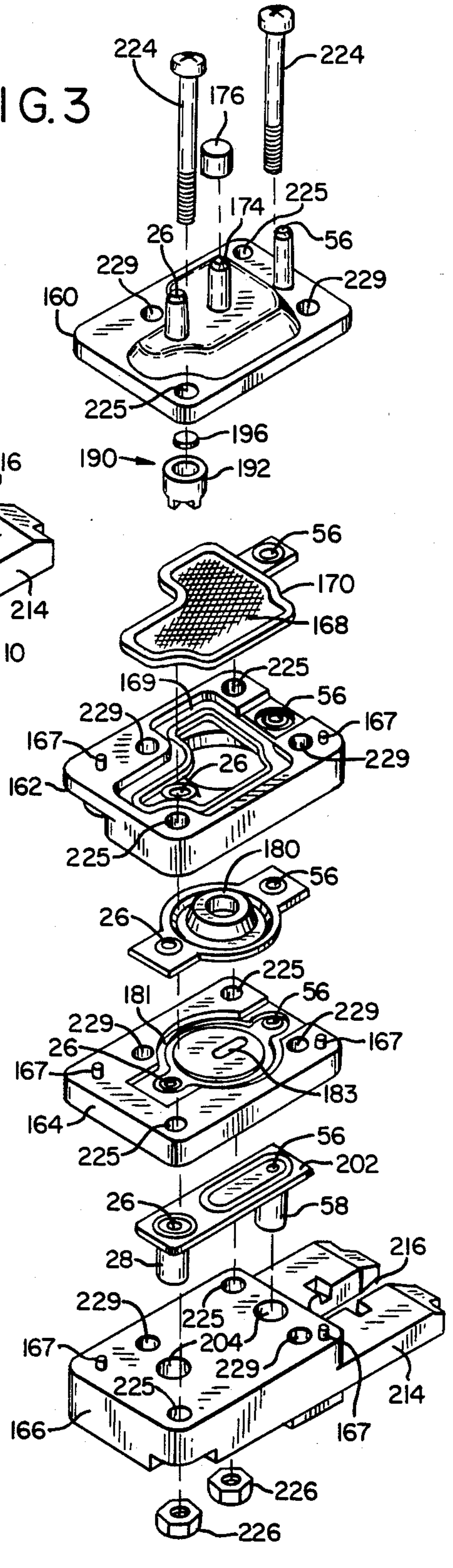
FIG. 3 is an exploded isometric view of portions of the ink drop generating module of FIG. 1.

In the illustrated embodiment, the body 12 is of multi-section construction, best seen with reference to FIG. 3. In particular, body 12 includes a valve body supporting and bubble trapping section 160, an ink filter supporting or seating section 162, a diaphragm body supporting section 164 and a head holder section 166 to which the printing head 14 is attached, as explained below. Each of these body sections is provided with a pair of pins 167 which mate with corresponding openings in the adjacent body portion to align and interlock the body sections.

With reference to FIG. 2, ink passing along the ink passageway 26 enters a chamber 172 defined within the body section 160. The ink flows from chamber 172 through a filter 168 and continues along the passageway 26 to the printing head 14. Filter 168 is designed to filter out particulate matter and bubbles of a size that could interfere with the functioning of the head. As one example, filter 168 may comprise a 5 micron mesh stainless steel screen formed integrally with a surrounding gasket 170 (FIGS. 2 and 3). This filter is positioned between the body sections 160 and 162 and is received within a seat 169 of the filter supporting body section 162. The gasket 170 seals the space between these body sections and also seals the air passageway 56 at the location where it passes between these sections. Any entrained air bubbles reaching filter 168 are blocked from continuing in the passageway 26 to the ink jet head 14. These trapped bubbles rise and collect within the chamber 172. A purging vent 174, normally closed by a cap 176, is opened to the atmosphere as needed to remove air from the chamber 172. Air trapped within chamber 172 is forced out through vent 174 by removing cap 176 and delivering ink to the chamber.

Short duration pressure transients in the ink line pressure, particularly high frequency variations, can result in pressure drops in the ink pressure supply passage. These pressure drops can cause the ingestion of air within the drop-forming orifice 38 of the head and the formation of a print head clogging air bubble. To attenuate these pressure transients, and to minimize or eliminate negative pressure drops in the ink supply lines, the body 12 contains a high frequency ink transient suppressor mechanism. In the illustrated form, the mechanism comprises filter 168, which restricts ink flow somewhat, and a diaphragm 180. This pressure transient suppressor operates in a manner which is analogous to a low band-pass electrical RC filter. A large fluid filter RC time constant is desired in order to maximize high frequency pressure transient attenuation. However, it is also important that the RC time constant be much lower than the air supply system time constant so as to avoid air ingestion during system start up. Furthermore, it is desirable that the resistive component of the RC filter offer relatively low resistance to the fluid flow so as to not impede the normal direct current flow rate of ink through the module. Correspondingly, to achieve a high RC time constant with a low resistance, a relatively high capacitance is preferred.

In the transient suppressor of the preferred embodiment, as mentioned, the filter 168 comprises the resistive component of the RC ink pressure transient suppressor. The capacitance component of the suppressor is provided by the diaphragm 180. Diaphragm 180 is received within a correspondingly shaped seat 181 of the diaphragm body supporting section 164. Also, this diaphragm is formed as part of a gasket which seals both the ink passageway 26 and air passageway 56 at the location where these passageways extend between the body sections 162 and 164.

As can be seen from FIG. 2, an ink accumulating region 182 is provided at the ink side of the diaphragm 180. The opposite side of the diaphragm is exposed to an air receiving chamber 184 which communicates, via a passageway 183, with the air supply passageway 56. Therefore, during normal operation, regulated air from the pump 40 not only provides pressure to the ink cartridge 16, as previously explained, but also pressurizes one side of the diaphragm via conduit 54. The lower the pressure differential across the diaphragm, the higher the capacitance provided by the diaphragm. In theory, it would be desirable to reduce this pressure differential to zero. However, for the print head 14 to operate, a pressure differential between the ink and air is required at the head. Consequently, after $h_o$ is established to provide the desired relative pressure difference between the ink and air at the head, the pressure across the diaphragm is determined by the elevation $h_c$. In a typical example, with the head orifice pressure differential at 3.0 inches of water, the differential across the diaphragm is approximately 3.5 inches of water. Because of this relatively low pressure differential across the diaphragm, a very high capacitance is obtained from a small diaphragm. This reduces the size of body 12. Furthermore, the low resistance to fluid flow, due to the filter 68, still results in a relatively high RC time constant because of relatively high capacitance achieved with this construction.

Also, with this construction, ink is pressurized by the same air supply which pressurizes the air side 184 of the diaphragm 180. Therefore, except during replenishment of the ink in the air chamber, variations in the air supply pressure have a similar effect on the ink supply pressure. As a result, the differential across the diaphragm, and thereby the capacitance, is virtually constant even though the air pressure fluctuates. Furthermore, even if the air supply system happens to be turned off, for example when the printer is moved, capacitance is still present in the pressure transient suppressor system.

This transient suppressor is also applicable to non-air assisted ink jet printers. In such a case, the chamber 184 may be pressurized from an air supply used to pressurize the ink cartridge. Alternately, chamber 184 may either be exposed to the atmosphere or pressurized by a different source.

The module also includes a mechanism for suppressing low frequency variations in ink pressure. This latter mechanism compensates for drops in ink pressure relative to air pressure of too long of a duration to be significantly attenuated by the RC low pass fluid filter.

In the illustrated embodiment, this low frequency pressure transient suppressor mechanism comprises a check valve 190 having a housing 192 within which a valve closing disk 196 moves. When the disk 196 is in the position shown in FIG. 2 (see also FIG. 3), fluid passes along the ink passageway 26 and through the valve. The disk 196 moves upwardly and closes passageway 26 in response to a drop in pressure in the ink supply line upstream of the valve 90. The disk 196 may be formed of a material which has a specific gravity which is lower than that of the ink. Therefore, the disk 196 naturally tends to float upwardly into a closed position. This decreases the time required for disk 196 to close the valve when the ink pressure drops. In addition, the ink from chamber 172 assists in moving the disk 196 to a closed position. That is, when a long term pressure drop occurs, the diaphragm 180 moves away from air chamber 184 and toward the fluid accumulator chamber 182. This diaphragm movement forces fluid in a direction which aids the seating of disk 196.

For sealing purposes, a gasket 202 is positioned between the diaphragm supporting section 164 and the head holding section 166. Sleeves 28 and 58, comprising the ink and air outlets from the body 12, are formed as part of gasket 202. The sleeves 28 and 58 fit within respective sleeve receiving apertures 204 of the head supporting body section 166. The sleeve 28 interconnects the ink passageways 26 and 30. Also, the sleeve 58 interconnects the air passageways 56 and 60.

The ink drop generating module 10 is mounted by the head holder body section 166 to the carriage of the printer in the following manner. The head holder body section 166 includes a mounting bracket 214 having a slot 216. The bracket 214 rests on a carriage connecting bracket 218 which is a part of the carriage of the printer. A carriage fastener screw 220 passes through a spacing block 217, the slot 216, and is threaded into the carriage supporting bracket 218 to secure module 10 to the carriage.

In a typical printer, plural modules are provided side by side. It then becomes necessary to initially align the orifices 66 so that they converge on a common path on the printing medium. This initial convergence adjustment may be accomplished in the present invention by loosening carriage screw 220, moving the module to the desired position, and then retightening the screw. As previously explained, convergence is enhanced during the operation of the ink jet printer by replenishing the ink in the air chamber 64.

Head spacing legs 210, 212 project downwardly from the lower exterior surface of head holding body section 166. It is important to establish the distance between the head and printing medium, in accordance with tolerances typically provided by manufacturers of printing heads. The legs 210, 212 are formed of different lengths, depending on the head, to establish the necessary spacing. That is, the body 12 is held on the carriage mounting bracket 218 in a fixed position relative to the printing medium. Also, ink jet head 14 rests against the legs 210, 212. Therefore, the length of the legs 210, 212 establishes the distance between the main ink drop orifice 66 and the medium.

The entire body assembly 12 is held together by fasteners 224 which extend through openings 225 in the respective body sections and are secured by nuts 228 (see FIG. 3). Also, ink printing head fasteners 228 (FIG. 1) extend through respective openings 229 (FIG. 3) of the body sections and are threaded into the upper surface of the head 14 to secure the head to the body.

Therefore, in accordance with the present invention, an apparatus and method has been described for increasing the accuracy at which ink droplets are applied to a printing medium. More specifically, the convergence of ink droplets along a common path of the print medium is enhanced. Moreover, the uniformity in size and shape of ink droplets generated by the ink jet print head is also improved.

Having illustrated and described the principles of our invention with reference to one preferred embodiment, it should be apparent to those persons skilled in the art that such invention may be modified in arrangement and detail without departing from such principles.

We claim as our invention all such modifications as come within the true spirit and scope of the following claims:

1. A method of operating an ink jet print head of an ink jet printer, the ink jet print head having an ink supply passageway through which pressurized ink is delivered to an ink chamber within the ink jet print head and an air supply passageway through which air is delivered to an air chamber within the head, the ink chamber communicating through an ink droplet forming orifice with the air chamber, and the air chamber communicating through a main ink droplet generating orifice to the exterior of the ink jet print head, ink droplets being generated within the ink chamber an passing through the internal orifice and air chamber to the main orifice, and pressurized air entering the air chamber assisting in directing the ink droplets outwardly from the main orifice and towards printing medium to print a copy of an image on such medium, the method comprising:

introducing sufficient ink into the air chamber from time to time as the ink jet printer operates to maintain the quantity, shape and position of the ink remaining within the air chamber.

2. A method according to claim 1 further comprising the step of reducing the air pressure in the air chamber relative to the ink pressure in the ink chamber so as to allow ink to flow from the ink chamber into the air chamber and replenish the ink therein.

3. A method according to claim 2 comprising the further step of simultaneously increasing the pressure in the ink chamber as the air pressure in the air chamber is reduced.

4. A method according to claim 2 comprising the step of reducing the air pressure in the air chamber at times when the ink jet print head is not being utilized to apply ink droplets to the printing medium.

5. A method according to claim 2 comprising the step of reducing the pressure in the air chamber between each copy made by the ink jet printer so as to replenish the ink in the air chamber between the making of each such copy.

6. A method of operating an ink jet print head of an ink jet printer, the ink jet print head having an ink supply passageway through which pressurized ink is delivered to an ink chamber within the ink jet print head and an air supply passageway through which air is delivered to an air chamber within the ink jet print head, the ink chamber communicating through an ink droplet forming orifice with the air chamber, and the air chamber communicating through a main ink droplet generating orifice to the exterior of the ink jet print head, ink droplets being generated within the ink chamber and passing through the internal orifice and air chamber to the main orifice, and air entering the air chamber assisting in directing the ink droplets outwardly from the main orifice and towards printing medium to print a copy of an image on such medium, the method comprising:

interrupting the flow of air to the air chamber while maintaining the flow of ink to the ink chamber so as to allow sufficient ink to flow from the ink chamber and into the air chamber to maintain the quantity, shape and position of the ink remaining within the air chamber.

7. A method according to claim 6 further comprising pressurizing the ink delivered to the ink chamber and the air delivered to an air chamber from a common pressure source and maintaining pressure into the ink cartridge at times the air flow is interrupted.

8. A method according to claim 7 comprising the step of increasing the pressure to the ink cartridge at times when the air flow is interrupted.

9. A method according to claim 6 in which the ink jet print head is returned to a first position following the printing of each copy, the method including the step of detecting the return of the ink jet print head to a first position, interrupting the flow of air to the ink jet print head during at least certain of the occurrences of the return of the ink jet print head to the rest position, and reestablishing the flow of air to the air chamber after a predetermined time period.

10. A method according to claim 9 further comprising the step of collecting ink ejected from the main orifice upon the reestablishment of the air flow.

11. A method according to claim 9 comprising the step of interrupting the air flow during each occurrence of the return of the ink jet print head to the first position.

12. A method according to claim 6 in which the ink jet printer has plural ink jet print heads, the method comprising the step of interrupting the air flow for a sufficient period of time to allow ink to replenish the ink in the air chambers of each of the ink jet print heads of the ink jet printer.

13. An apparatus for operating an ink jet print head of an ink jet printer, the ink jet print head having an ink supply passageway through which pressurized ink from an ink cartridge is delivered to an ink chamber within the head and an air supply passageway through which pressurized air from an air supply is delivered to an air chamber within the ink jet print head, the ink chamber communicating through an ink droplet forming orifice with the air chamber, the air chamber communicating through a main ink droplet generating orifice with the exterior of the ink jet print head, ink droplets being generated within the ink chamber and passing through the internal orifice and air chamber to the main orifice, and pressurized air entering the air chamber assisting in directing the ink droplets outwardly from the main orifice and towards the printing medium to print a copy of an image on such medium, the apparatus comprising:

ink supply conduit means for delivering ink under pressure from the ink cartridge to the ink chamber;

air supply conduit means for delivering pressurized air from the air supply to the air chamber; and air flow interrupter means for selectively interrupting the supply of air to the air chamber so as to enable sufficient ink to flow from the ink chamber to the air chamber to maintain the quantity, shape and position of the ink remaining within the air chamber.

14. An apparatus according to claim 13 in which the air flow interrupter means comprises a valve means for opening the air supply conduit means when the valve means is in a first position and for closing the air supply conduit means when the valve means is in a second position to thereby interrupt the supply of air to the air chamber, and valve actuating means for selectively shifting the valve means from the first to the second position.

15. An apparatus according to claim 14 in which the last named means comprises means for selectively shifting the valve means to the second position for predetermined time intervals.

16. An apparatus according to claim 14 in which the air supply conduit means includes a first conduit section communicating from the air supply to the valve means and a second conduit section communicating from the valve means to the air chamber, the first and second conduit sections being in fluid communication through the valve means when the valve means is in the first position and fluid communication therebetween being blocked when the valve means is in the second position, the ink cartridge having a collapsible ink container in fluid communication with the ink supply conduit means, the ink cartridge also including a housing within which the ink container is positioned, the housing having an air inlet coupled to the first conduit section such that pressurized air is delivered to the housing to apply pressure to the ink container and cause the flow of ink from the ink container through the ink supply conduit means to the ink chamber, whereby upon shifting of the valve means to the second position, air pressure to the ink container is continuously applied from the first conduit section so as to maintain the ink pressure within the ink chamber while the air flow in the second conduit section is interrupted by the valve means.

17. An apparatus according to claim 16 including air pressure regulator means in the first conduit section upstream of the air inlet of the housing for regulating the pressure of air delivered through the first conduit section to the housing, the apparatus including bypass means for bypassing the air pressure regulator means and delivering unregulated air to the air inlet upon shifting of the valve means to the second position so as to increase the ink pressure in the ink chamber when air flow to the air chamber is interrupted.

18. An apparatus according to claim 16 in which the bypass means includes a third conduit section communicating with the first conduit section at a location upstream of the air regulator means, the third conduit section being coupled to the valve means and communicating with the first conduit section through the valve means when the valve means is in the second position, fluid flow through the third conduit section being blocked by the valve means when the valve means is in the first position.

19. An apparatus according to claim 18 in which the ink jet print head is returned to a first position following the printing of a copy, the valve actuating means comprising means for shifting the valve means to the second position for a predetermined time period upon each return of the ink jet print head to the first position to thereby interrupt the flow of air to the air chamber for a predetermined time period upon each return of the ink jet print head to the first position.

* * * * *